July 1, 1924.
W. R. DAVIS
1,499,858
FISHHOOK HOLDER
Filed Jan. 27, 1922
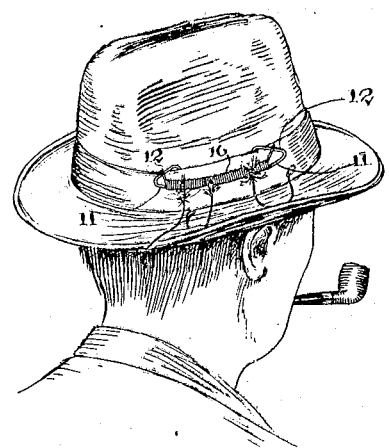
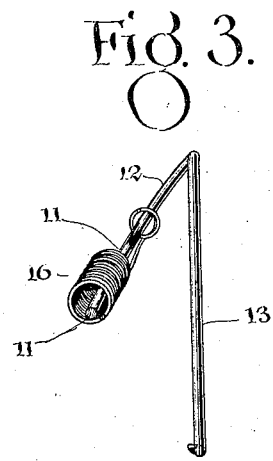
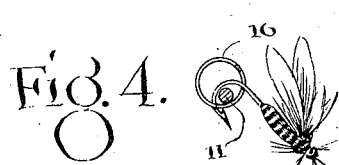
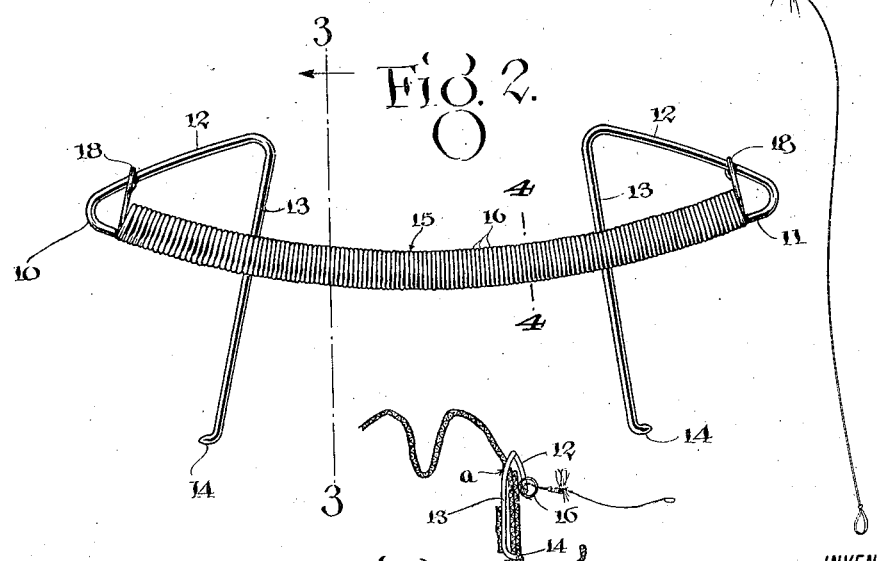
WITNESSES
INVENTOR
W. R. DAVIS.
BY
ATTORNEYS Patented July 1, 1924.

1,499,858

UNITED STATES PATENT OFFICE.

WILLIAM R. DAVIS, OF WALLACE, IDAHO.

FISHHOOK HOLDER.

Application filed January 27, 1922. Serial No. 532,191.

*To all whom it may concern:*

Be it known that I, WILLIAM R. DAVIS, a citizen of the United States, and a resident of Wallace, in the county of Shoshone and State of Idaho, have invented certain new and useful Improvements in Fishhook Holders, of which the following is a specification.

This invention relates to an improvement in fish hook holders, and has for its object to provide a device of this character which is of extremely simple and durable construction, which may be readily manufactured at comparatively low cost and which provides a safe and convenient means for carrying fishing hooks, flies or the like, the hooks being firmly though releasably held and accidental displacement thereof being precluded.

Another object is to provide a holder of this character which may be readily associated with any convenient support such for instance as a hat or the like.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a perspective view, illustrating the invention applied to a hat;

Figure 2 is a view, in elevation, illustrating the invention detached from any support;

Figure 3 is a view in section, on line 3—3 of Figure 2;

Figure 4 is a similar view in section on line 4—4 of Figure 2, and showing a fishing fly supported by the holder; and Figure 5 is a view in section, illustrating the manner in which the holder is applied to the hat.

Referring to the drawings wherein for the sake of illustration is shown the preferred embodiment of the invention, the numeral 10 designates generally a frame constructed of resilient wire and including a longitudinally extending and curved rod 11 and arms 12 formed at the ends of the rod and preferably integral therewith, the arms 12 being bent back so as to overlie the curved rod 11.

The frame is provided with attaching means which preferably comprises penetrating prongs 13 integrally formed with the arms 12 and having their ends angularly extended or offset and pointed, as shown at 14. These penetrating prongs coact with the support for the holder in a manner which will be hereinafter more fully described.

A rack, designated at 15, is mounted on the frame and preferably comprises a coil of resilient wire, the convolutions 16 of which resiliently engage each other. The coil is mounted on the frame so that the curved rod 11 of the frame extends through the opening of the coil, as clearly shown in Figures 3 and 4, and this curved rod coacts with any two adjacent convolutions in supporting or holding a fishing fly or hook, as shown to advantage in Figure 4. The terminals of the coil 15 are straightened and extended laterally and their ends are provided with loops or eyes 18 which embrace the arms 12 thereby effecting the proper disposition of the coil with respect to the curved rod 11.

In applying the holder to a support, such for instance as a hat, the penetrating prongs 13 which are normally inclined slightly from the vertical, as shown in Figure 2 are swung to substantially vertical position and the pointed ends of the prongs are then inserted through the side of the crown of the hat, as indicated at *a* in Figure 5. The penetrating prongs are then passed down along the inside of the crown and between the crown and the sweat band and adjacent the brim the pointed ends 14 of the penetrating prongs again pass through the hat as indicated at *b* so that they lie in between the band of the hat and the crown thereof. In this manner the holder is firmly and positively secured in position on the support and it is so related thereto that the articles which the holder carries are not liable to become displaced, for instance in travelling through thick underbrush or the like, as the contact with the brush will only serve to more firmly tighten or position the flies or hooks on the holder and this is also generally true.

It is to be noted that the hooks, flies or other articles supported are not only held on the rack of the holder by the frictional engagement of adjacent convolutions with the shank and bill of the hook but also are positively engaged by the rod 11 especially at such times as the hooks or flies are submitted to any action tending to displace them from the holder for at these times the bill of the hook embraces the rod 11 and it is impossible without breaking the hook or the rod to pull the hook from the holder. At the same time the hooks or flies may be readily disengaged by the fisherman by simply pushing upwardly on the hook and manipulating it out of engagement with the rod 11. The holder has a capacity for carrying a relatively large number of hooks as is evident from an inspection of Figure 2 wherein is shown in a compact space a multiplicity of convolutions, any two adjacent ones of which may serve to hold a fly, hook or similar article.

I claim:

1. A fishing hook holder comprising a frame constructed of resilient wire and including a curved rod and arms at the ends of the rod arranged to overlie the rod, said frame having attaching means comprising penetrating prongs integral with and depending from said arms and provided with angularly extended pointed ends and a rack for the fishing hooks, fishing flies or the like carried by the frame and comprising a coil of resilient wire mounted on the frame, the curved rod of the frame extending through the opening of the coil and coacting with the convolutions of the coil for retaining the fishing hooks, fishing flies or the like in position, the terminals of the coil being extended laterally and provided with eyes embracing the arms of the frame.

2. A fishing hook holder comprising a frame, constructed of resilient wire and including a curved rod and arms at the ends of the rod, and a rack for the fishing hooks, fishing flies or the like carried by the frame and comprising a coil of resilient wire mounted on the frame, the curved rod of the frame extending through the opening of the coil and coacting with the convolutions of the coil in retaining the fishing hooks, fishing flies or the like in position, the terminals of the coil being extended laterally and provided with eyes embracing the arms of the frame.

3. A fishing hook holder comprising a frame constructed of resilient wire and including a curved rod, and a rack for the fishing hooks, fishing flies or the like carried by the frame and comprising a coil of resilient wire mounted on the frame, the curved rod of the frame extending through the opening of the coil and coacting with the convolutions of the coil for retaining the fishing hooks, fishing flies or the like in position, the curved rod being adapted to come into engagement with the fishing hooks, fishing flies or the like to positively prevent displacement of the same.

4. A fishing hook holder comprising a frame including a curved rod, and a rack for the fishing hooks, fishing flies or the like carried by the frame and comprising a coil having convolutions resiliently engaged with each other, any two adjacent convolutions being adapted to coact with the curved rod to support a fishing hook, fishing fly or the like.

5. A fishing hook holder comprising a frame including a rod, a rack for the fishing hooks, fishing flies or the like carried by the frame and comprising a coil of resilient wire mounted on the frame and through which the rod of the frame extends, the rod being adapted to coact with the convolutions of the coil to retain the fishing hooks, fishing flies or the like in position and attaching means for said holder carried by said frame.

6. A fishing hook holder comprising a frame including a rod and arms and a rack for the fishing hooks, fishing flies or the like carried by the frame and comprising a coil mounted on the frame and through which the rod extends, the rod being adapted to coact with the convolutions of the coil for retaining the fishing hooks, fishing flies or the like in position, said coil having its terminals extended and provided with loops embracing the arms of the frame and attaching means carried by said frame.

7. A fishing hook holder comprising a frame and a coil of resilient wire mounted on the frame, the convolutions of the coil being directly engageable with the fishing hooks, fishing flies or the like for supporting the same and the frame coacting with the coil to prevent accidental displacement of the fishing hooks, fishing flies or the like.

8. A fishing hook holder including a coil of resilient wire having its convolutions tensioned so that adjacent convolutions may be spread axially of the coil to permit the insertion of a fish hook between said adjacent convolutions, the adjacent convolutions so spread being tensioned to frictionally engage the fishing hook to support and hold the same.

WILLIAM R. DAVIS.